July 6, 1948.　　　　　　　J. W. FRIED　　　　　　2,444,562
　　　　　　FOOT CONTROL ACCESSORY FOR DRILL PRESSES
Filed July 28, 1944　　　　　　　　　　　　　　2 Sheets-Sheet 1

INVENTOR.
JOSEPH W. FRIED
BY
ATTORNEYS

July 6, 1948.  J. W. FRIED  2,444,562
FOOT CONTROL ACCESSORY FOR DRILL PRESSES
Filed July 28, 1944  2 Sheets-Sheet 2

INVENTOR.
JOSEPH W. FRIED
BY
Hazard and Miller
ATTORNEYS

Patented July 6, 1948

2,444,562

UNITED STATES PATENT OFFICE 2,444,562

FOOT CONTROL ACCESSORY FOR DRILL PRESSES

Joseph W. Fried, Los Angeles, Calif.

Application July 28, 1944, Serial No. 547,052

2 Claims. (Cl. 77—30)

This invention relates to a device for mounting a burring or chamfering tool and to a mechanism for operating the same.

An object of the invention is to provide a device on which a burring or chamfering tool can be conveniently mounted and power-driven and to provide a foot-operated mechanism for operating the burring tool so that the operator is free to use both hands in applying the work to the tool and removing it therefrom.

Another object of the invention is to provide a bracket applicable to the quill of a drill press or similar construction on which a yoke is pivotally mounted that is adapted to be operatively connected to the operating collar of a burring tool or similar device that is adapted to be mounted on the spindle and to provide a construction whereby the yoke may be readily connected to or disconnected from the operating collar of the tool to facilitate removal and replacement of the tool.

With the foregoing and other objects in view, which will be made manifest in the following detailed description and specifically pointed out in the appended claims, reference is had to the accompanying drawings for an illustrative embodiment of the invention, wherein:

Figure 1:
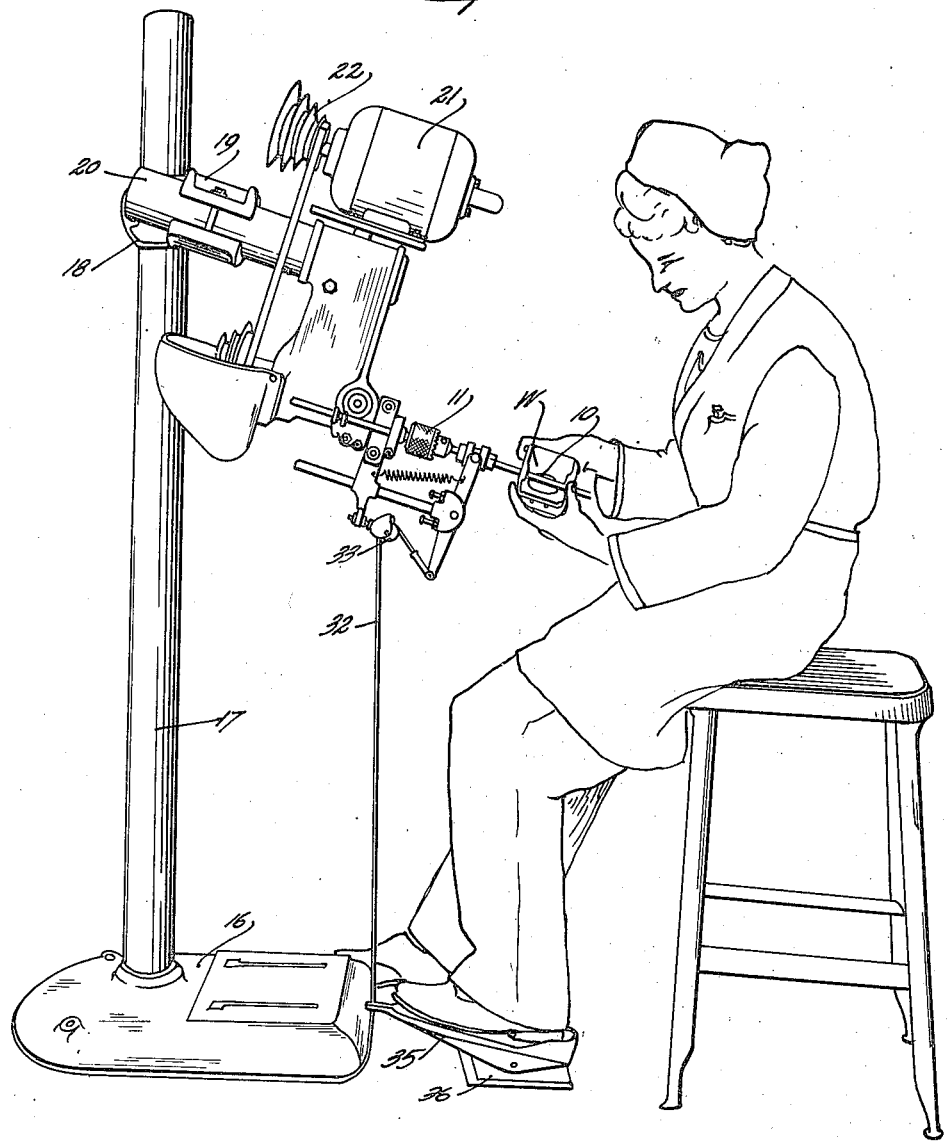
Figure 1 is a perspective view illustrating the apparatus embodying the present invention and the manner in which it is used.
Figure 2:
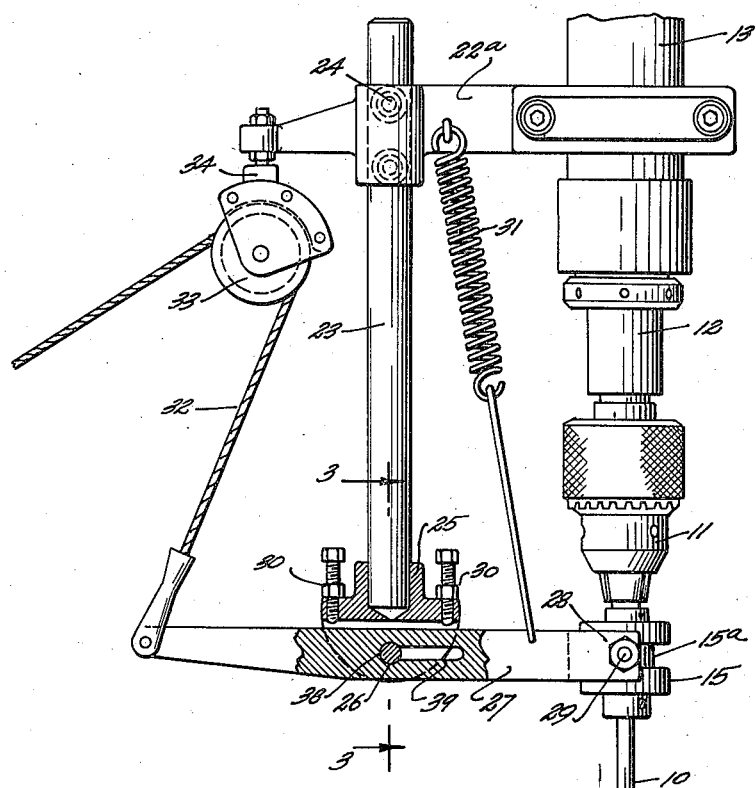
Fig. 2 is a partial view in side elevation, parts being broken away and shown in section illustrating details of construction.

Referring to the accompanying drawings wherein similar reference characters designate similar parts throughout, the present invention relates to a mechanism for mounting and operating a rotary tool such as the tool disclosed in United States Letters Patent No. 2,314,084, issued March 16, 1943, to Armin Fried. Such a tool, as illustrated in Fig. 2, consists of a cylindrical shank 10 the upper end of which is adapted to be mounted in a chuck 11 which, in turn, is mounted on a spindle 12 that is rotatable within a quill 13. Within the shank 10 of the tool there is a cutter 14 which can be advanced or projected beyond the sides of the shank or may be retracted to assume a position wholly within the general cylinder defined by the surfaces of the shank. The cutter 14 is advanced and retracted by a collar 15 which is grooved as at 15a so that when the collar is forced downwardly as viewed in Fig. 2, the cutter is advanced and when the collar is lifted upwardly the cutter 14 is caused to retract.

By means of the burring tool as above described, the shank 10 may be inserted in a drilled hole while the cutter is in retracted position and the cutter after having passed through the hole, may then be projected and brought into engagement with the edges of the hole to remove burrs that may be left as a result of the drilling operation. After the burrs have been removed the cutter can then be retracted and the work slipped off of the shank.

The present invention comprises a means for suitably mounting the tool and operating it so that the operator may use both hands in applying the work indicated at W to the shank 10 and removing it therefrom. It consists of a suitable base 16 on which there is a column 17 equipped with an adjustable clamp 18. A second clamp 19 is connected to clamp 18 so as to be rotatably adjustable relatively thereto. This clamp is adapted to clamp on the stem of the column 20 of a drill press or similar power-driven piece of equipment having for example an electric motor 21 and an adjustable belt drive 22 that connects the motor with a spindle 12 so as to rotate it. By loosening the clamps 18 and 19 the stem 20 and its associated structure may be raised or lowered on the column 17 and swung or tilted in any position suitable to the operator.

A feature of the invention relates to the construction employed to shift the position of the collar 15 so as to advance and retract cutter 14. This consists of a suitable bracket or clamp 22a adapted to be clamped about the quill 13. On this bracket there is adjustably mounted a bar 23 that is held in adjusted position, such as by set screws 24. On the end of the bar there is secured a clevis 25 between the sides of which there extends a shiftable pin 26 constituting a pivot pin for a yoke 27 the arms of a which, indicated at 28, extend around the collar 15. Studs 29 are mounted on the arms of the yoke and extend into the groove 15a. Screws 30 are mounted on the clevis on opposite sides of the pin 26 and are engageable with the yoke to limit pivoting movements of the yoke 27 about the pin 26 as a center. A tension spring 31 connects the yoke with bracket 22a urging the yoke into that position wherein collar 15 is in its uppermost position and cutter 14 is retracted. The outer end of the yoke has a cable 32 secured thereto which is trained over a pulley 33 mounted in a suitable carrier 34 that may be pivoted or otherwise adjustable upon bracket 22a. This cable then extends downwardly and is connected to a treadle 35 that is pivotally mounted upon a base 36.

Figure 3:
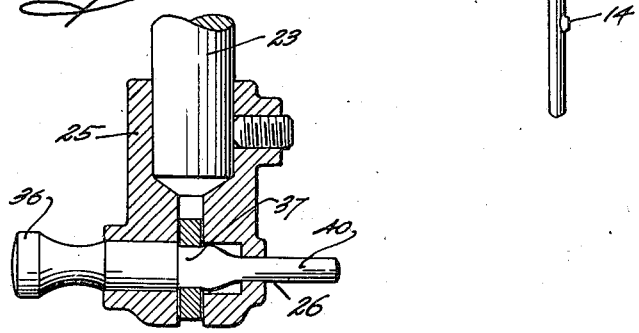
Fig. 3 is a sectional view taken substantially upon the line 3—3 upon Fig. 2 in the direction indicated.

As will be noted from an inspection of Fig. 3, pin 26 has a handle 36 and has portions of two diameters, one portion being indicated at 37 that is arranged to substantially fit the large end 38 of slot 39. The portion of reduced diameter, indicated at 40, is of such a size as to extend through the narrow portion of the slot 39. Thus, when the large portion 37 is occupying the large end of the slot the yoke 27 may merely pivot about pin 26 as a center. However, in order to remove and replace the burring tool by withdrawing pin 36 sufficiently so that the reduced portion 40 extends across the slot, yoke 27 may be caused to slide on pin 26 the length of the slot which disconnects the yoke from the collar 15 and moves it sufficiently so that the burring tool can be removed from the chuck and replaced. When the burring tool is replaced the yoke is caused to slide on pin 26 from left to right, as viewed in Fig. 2, after which the pin 26 is pushed rearwardly until the enlarged portion 37 is again occupying and fitting the large end 38 of the slot 39. In this way, a burring tool that may have become dulled can be easily and quickly removed and replaced without disturbing adjustment of the yoke, its operating cable, and its limiting stops afforded by screws 30.

In some instances, the burring tool is mounted directly on the spindle of a conventional drill press in which event bracket 22a may be clamped about the quill of the drill press and the cable 32, after being trailed around pulley 33, may be trained over additional pulleys that are fastened on the drill press table and then led to the treadle 35.

From the above-described construction it will be appreciated that the operator can readily employ both hands to apply the work W to the shank 10. Spring 31 will normally maintain the parts in that position wherein cutter 14 is retracted. After the work has been slipped onto the shank the treadle is depressed which causes the yoke 27 to swing, shifting collar 15 to a position wherein cutter 14 is advanced or projected. The work may then be slid on the shank to the required position for removing burrs or chamfering and upon release of the treadle 35 spring 31 will return the parts into cutter-retracting position. Thereafter, the work may be removed.

Various changes may be made in the details of construction without departing from the spirit and scope of the invention as defined by the appended claims.

I claim:

1. A device of the class described comprising a base having a column, a power driven machine having a quill and a spindle adjustably mounted upon the column, a bracket attachable to the quill, a stem on the bracket, a yoke pivotally mounted upon the stem, a treadle, and a cable connecting the yoke to the treadle so as to be operable thereby, the pivotal connection being provided by a pin having portions of two diameters and the yoke having a slot therethrough of varying sizes one portion of which receives that portion of the pin which is of larger diameter and the remainder of the slot receiving that portion of the pin which is of smaller diameter whereby the yoke may be optionally caused to pivot relatively to the stem or may be slid relatively thereto laterally with respect to the quill to disengage the tool which it operates to permit replacement.

2. A device of the class described comprising a base having a column, a power driven machine having a quill and a spindle adjustably mounted upon the column, a bracket attachable to the quill, a stem on the bracket, a yoke pivotally mounted upon the stem, a treadle, a cable connecting the yoke to the treadle so as to be operable thereby, the pivotal connection being provided by a pin having portions of two diameters and the yoke having a slot therethrough of varying sizes one portion of which receives that portion of the pin which is of larger diameter and the remainder of the slot receiving that portion of the pin which is of smaller diameter whereby the yoke may be optionally caused to pivot relatively to the stem or may be slid relatively thereto laterally with respect to said quill to disengage the tool which it operates to permit replacement, and spring means connecting the yoke and the bracket urging the yoke into a normal position.

JOSEPH W. FRIED.

REFERENCES CITED

The following references are of record in the file of this patent:

UNITED STATES PATENTS

| Number | Name | Date |
|---|---|---|
| 255,079 | Hartley | Mar. 14, 1882 |
| 576,404 | Hubbell | Feb. 2, 1897 |
| 2,314,084 | Fried | Mar. 16, 1943 |

FOREIGN PATENTS

| Number | Country | Date |
|---|---|---|
| 140,171 | Switzerland | Aug. 1, 1930 |